(12) United States Patent
Rajendran et al.

(10) Patent No.: US 10,911,329 B2
(45) Date of Patent: Feb. 2, 2021

(54) PATH AND CADENCE OPTIMIZATION FOR EFFICIENT DATA COLLECTION FROM DEVICES

(71) Applicant: Cisco Technology, Inc., San Jose, CA (US)

(72) Inventors: Ganesh Karthick Rajendran, San Jose, CA (US); Roy Nidesh Kantharajah, La Crosse, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/679,645

(22) Filed: Nov. 11, 2019

(65) Prior Publication Data

US 2020/0366575 A1    Nov. 19, 2020

Related U.S. Application Data

(60) Provisional application No. 62/846,901, filed on May 13, 2019.

(51) Int. Cl.
*H04L 12/24* (2006.01)
*G06F 16/901* (2019.01)
*H04L 29/08* (2006.01)

(52) U.S. Cl.
CPC ...... *H04L 41/5051* (2013.01); *G06F 16/9027* (2019.01); *H04L 41/0213* (2013.01); *H04L 41/046* (2013.01); *H04L 67/12* (2013.01)

(58) Field of Classification Search
None
See application file for complete search history.

(56) References Cited

U.S. PATENT DOCUMENTS

| 8,687,621 B2* | 4/2014 | Shah | H04L 45/121 |
| | | | 370/351 |
| 9,362,998 B2* | 6/2016 | He | H04B 7/0417 |

(Continued)

FOREIGN PATENT DOCUMENTS

KR    100276884 B1    1/2001

OTHER PUBLICATIONS

Dolberg, Lautaro et al., "Efficient Multidimensional Aggregation for Large Scale Monitoring", 26th Large Installation System Administration Conference (LISA '12), 2012, pp. 163-180.

*Primary Examiner* — Backhean Tiv
(74) *Attorney, Agent, or Firm* — Edell, Shapiro & Finnan, LLC

(57) ABSTRACT

Presented herein are embodiments for collecting and sharing telemetry data. A plurality of requests are received, from one or more applications, for telemetry data that is stored in a hierarchical tree representation comprising a plurality of nodes, wherein the telemetry data indicates an operational status and performance of a device, and wherein each request includes a cadence indicating a timespan at which the request repeats, and a path in the hierarchical tree where a requested portion of the telemetry data is stored. Processing the requests produces an optimized set of requests by merging any two or more requests whose paths indicate portions of data that share a common parent node in the hierarchical tree, wherein a merged request is assigned a cadence corresponding to a shortest cadence among the two or more requests. The hierarchical tree is polled using the optimized set of requests to satisfy the received requests.

20 Claims, 8 Drawing Sheets

(56) References Cited

U.S. PATENT DOCUMENTS

| | | | |
|---|---|---|---|
| 9,433,859 B1* | 9/2016 | Lin | A63F 13/00 |
| 9,558,297 B1* | 1/2017 | Bailey | G06F 12/023 |
| 9,658,936 B2 | 5/2017 | Krajec et al. | |
| 9,772,927 B2* | 9/2017 | Gounares | G06F 11/079 |
| 10,039,085 B2* | 7/2018 | Marinier | H04L 5/00 |
| 10,063,352 B2* | 8/2018 | Liu | H04L 1/1893 |
| 10,064,229 B2* | 8/2018 | Yang | H04L 1/1854 |
| 10,616,925 B2* | 4/2020 | Blankenship | H04W 74/0833 |
| 10,761,778 B2* | 9/2020 | Damgar | G06F 3/0659 |
| 2003/0005455 A1* | 1/2003 | Bowers | H04N 21/4622 |
| | | | 725/90 |
| 2003/0110436 A1* | 6/2003 | Golitschek Edler Von Elbwart | H04L 27/34 |
| | | | 714/748 |
| 2003/0167294 A1* | 9/2003 | Neuman | G06F 9/4881 |
| | | | 718/102 |
| 2005/0172197 A1* | 8/2005 | Chamberlain | H04L 1/0009 |
| | | | 714/748 |
| 2006/0215581 A1* | 9/2006 | Castagnoli | H04W 56/0015 |
| | | | 370/254 |
| 2011/0087915 A1* | 4/2011 | Zhang | H04L 12/1854 |
| | | | 714/2 |
| 2011/0205980 A1* | 8/2011 | Prakash | H04W 28/26 |
| | | | 370/329 |
| 2013/0042073 A1* | 2/2013 | Tao | H04L 1/0053 |
| | | | 711/133 |
| 2013/0272192 A1* | 10/2013 | Chang | H04L 1/1845 |
| | | | 370/328 |
| 2015/0085711 A1* | 3/2015 | Wang | H04L 1/1854 |
| | | | 370/280 |
| 2017/0230136 A1* | 8/2017 | Yan | H04L 1/0003 |
| 2020/0022175 A1* | 1/2020 | Xiong | H04W 72/0413 |
| 2020/0133569 A1* | 4/2020 | Damgar | G06F 3/0673 |
| 2020/0153556 A1* | 5/2020 | Nammi | H04W 72/0406 |

* cited by examiner

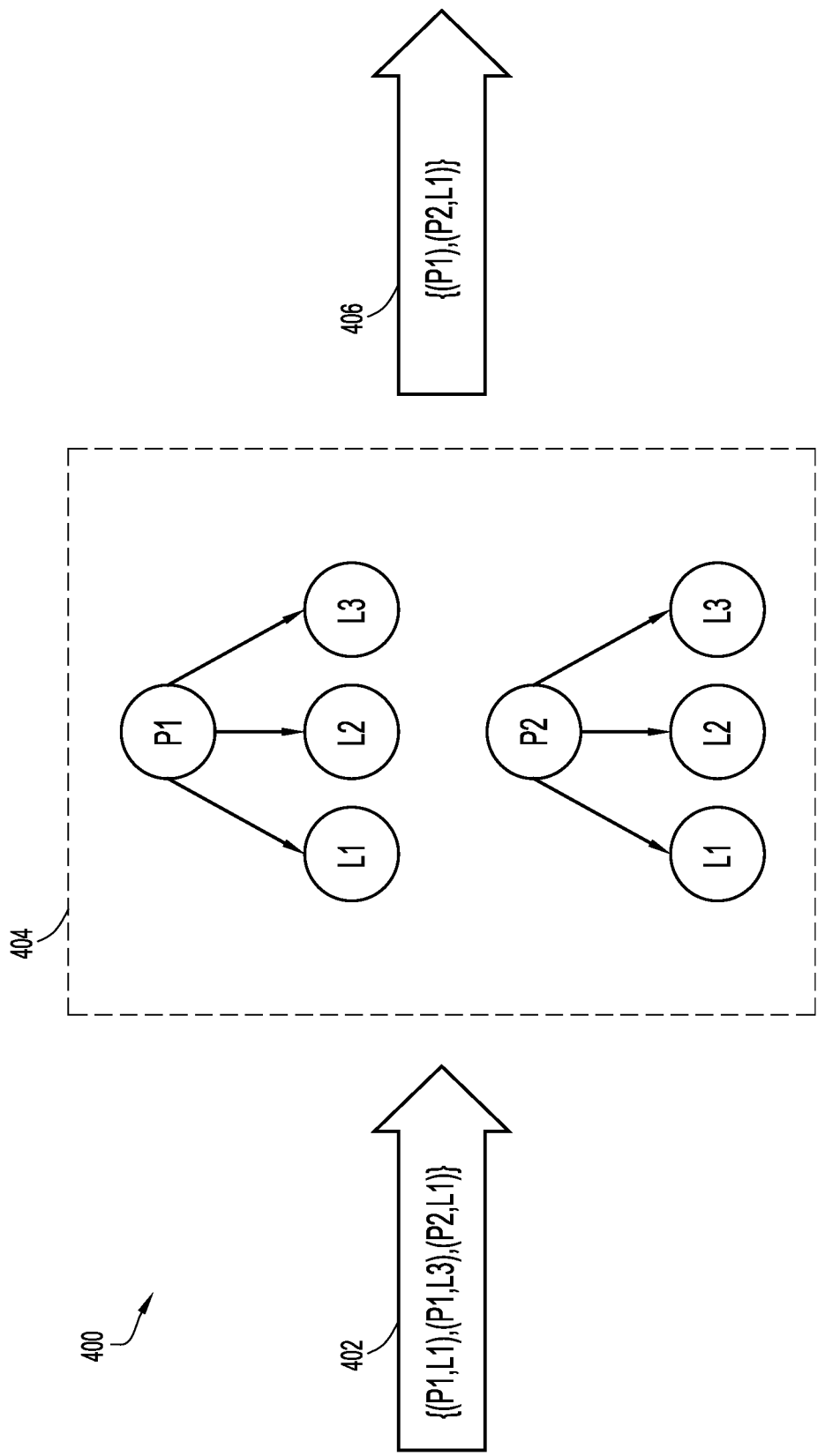

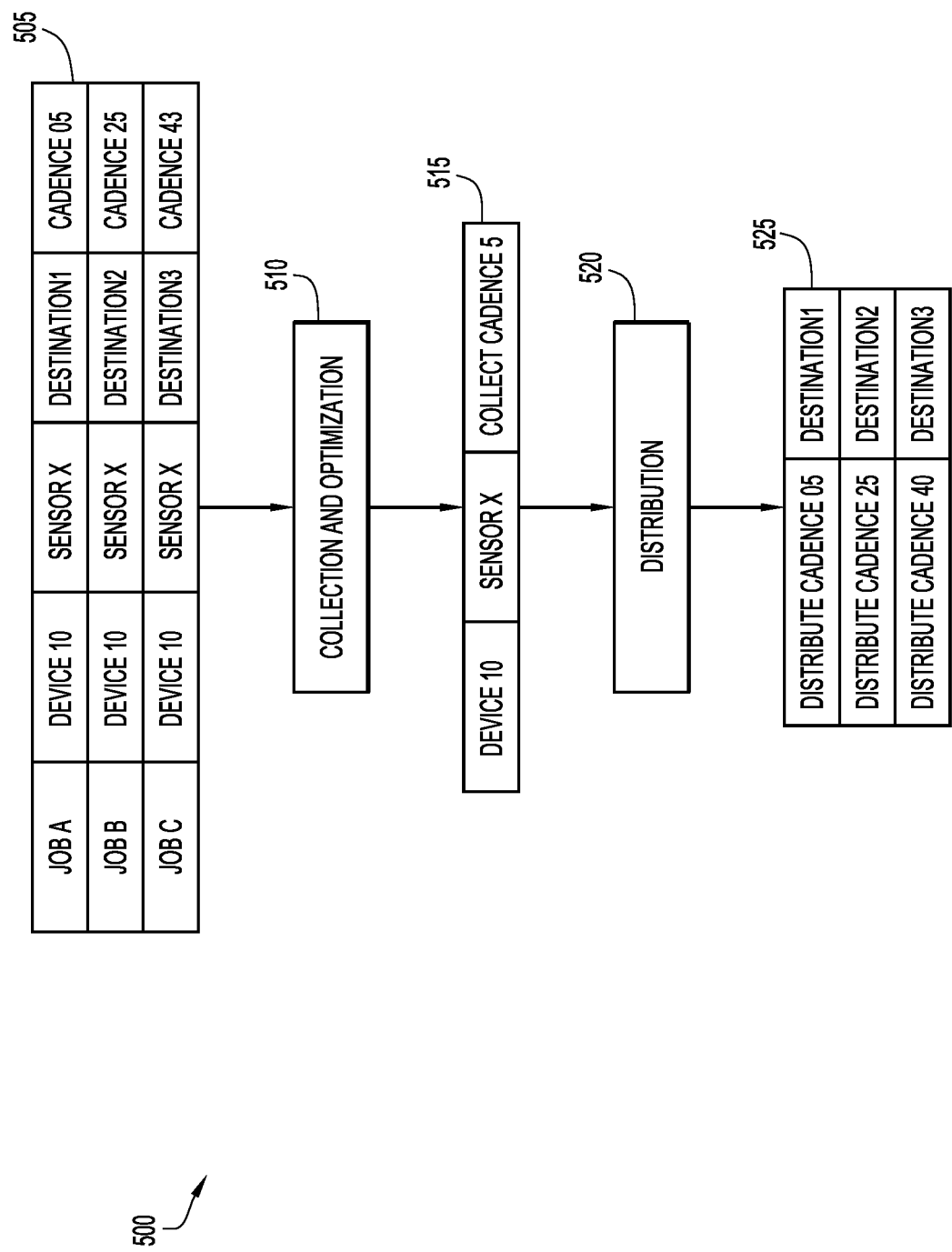

PATH AND CADENCE OPTIMIZATION FOR EFFICIENT DATA COLLECTION FROM DEVICES

PRIORITY CLAIM

This application claims priority to U.S. Provisional Application No. 62/846,901, filed May 13, 2019. The entirety of this application is incorporated herein by reference.

TECHNICAL FIELD

The present disclosure relates to monitoring network devices, and more specifically, to collecting and sharing telemetry data from network devices.

BACKGROUND

Network management solutions may require the deployment of multiple applications that collect data from devices on a network. Each application may perform data collection independently, resulting in disparate collections and overlapping requests for same or similar data from the same devices. Moreover, different applications may require data on a recurring basis but at different cadences, resulting in duplicated data retrieval. When applications independently perform data retrieval, the applications cannot take advantage of the closeness of different bits of data.

BRIEF DESCRIPTION OF THE DRAWINGS

FIGS. 4A and 4B are diagrams depicting operational flows for optimizing data retrieval, in accordance with an example embodiment.

FIG. 5 is a diagram depicting collection and sharing of telemetry data from a network device, in accordance with an example embodiment.

DESCRIPTION OF EXAMPLE EMBODIMENTS

Overview

Figure 1:
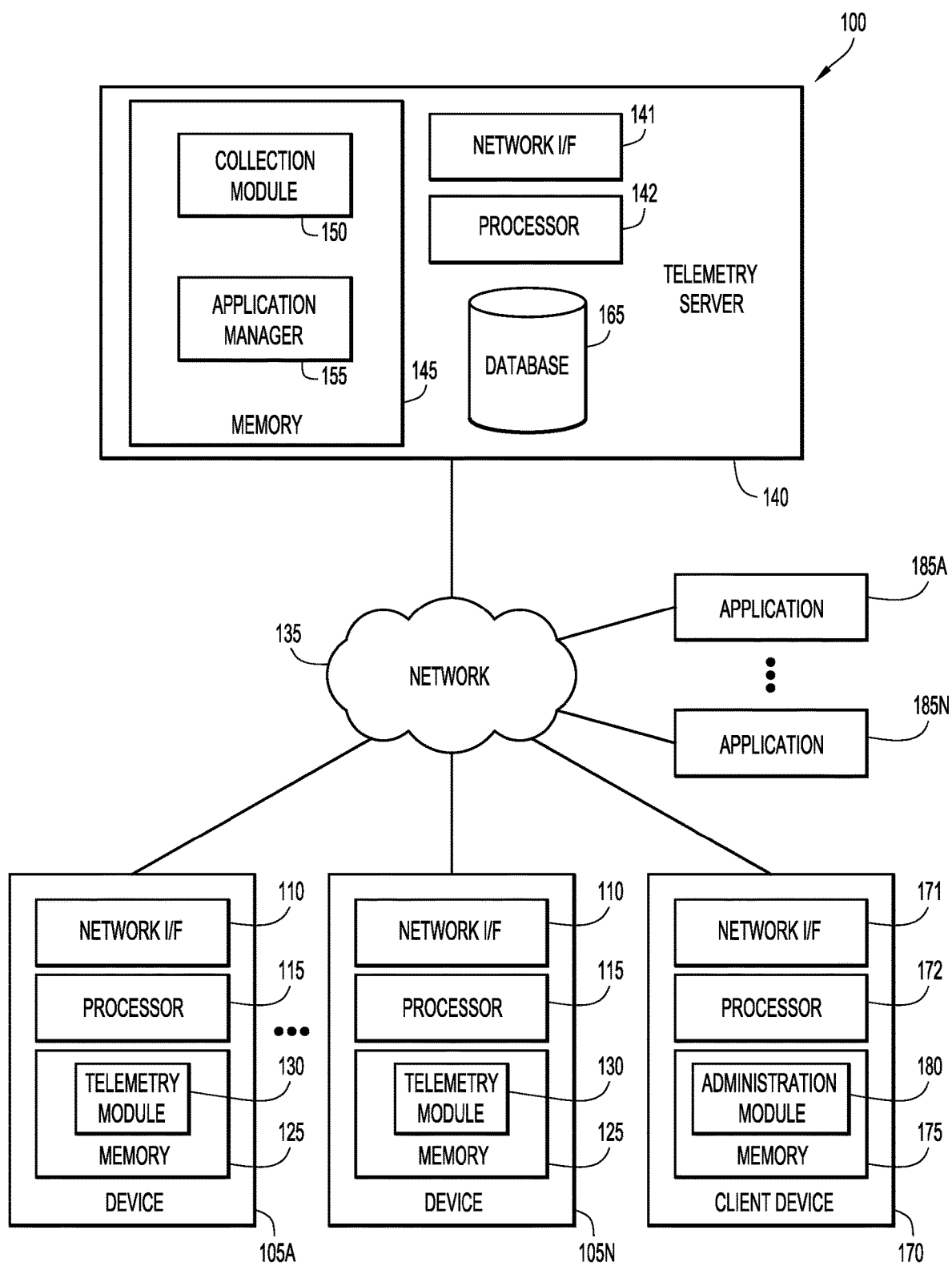
FIG. 1 is a block diagram depicting a network environment for collecting and sharing telemetry data for network devices, in accordance with an example embodiment.

In one embodiment, a solution is provided for collecting and sharing telemetry data. A plurality of requests are received, from one or more applications, for telemetry data from that is stored in a hierarchical tree representation comprising a plurality of nodes, wherein the telemetry data indicates an operational status and performance of a device. Each request includes a cadence indicating a timespan at which the request repeats, and each request specifies a path in the hierarchical tree representation where a requested portion of the telemetry data is stored. The plurality of requests are processed to produce an optimized set of requests by merging any two or more requests whose paths indicate portions of data that share a common parent node in the hierarchical tree representation, wherein a merged request is assigned a cadence corresponding to a shortest cadence among the two or more requests. The hierarchical tree representation is polled according to the optimized set of requests to satisfy the plurality of requests.

Example Embodiments

The present disclosure relates to monitoring network devices, and more specifically, to collecting and sharing telemetry data from network devices. Telemetry data may include any data that is relevant for observing the operational status or performance of a network device, such as state data, data collected by sensors of the device, etc. Telemetry data may initially be stored locally on network devices and may be managed by a centralized collection service through which applications can request the telemetry data. The centralized collection service may be aware of the closeness of different bits of data that are requested by applications, as well as the timespan over which applications repeat their requests for data, referred to as cadences. When multiple applications submit requests for data, a collection service may track the different paths of the requested data along with the cadences across all applications. The service may build a prefix-based tree of management information base (MIB) descriptions of network objects and Yet Another Next Generation (YANG) data tables, along with a min-heap of different cadences of paths across applications per device. In the YANG model, data is stored in leaf nodes of a YANG tree, and data in a particular node can be specified according to its YANG path. Embodiments presented herein identify a common prefix parent (e.g., node in a tree) across different portions of data, and retrieve the data at a parent node once, rather than performing multiple requests for data from different leaves (e.g., child nodes) of a device's telemetry data.

Thus, embodiments presented herein enable the data requests of multiple different applications to be satisfied without having to manage individual application data collection or service level agreement requirements. A network devices' data path is polled only once regardless of the number of applications, different cadences, and different application needs, thereby improving efficiency of a network by reducing the consumption of memory and processing resources. Dynamic and adaptive application data collection and service level agreement management result in a reduced data collection load on network devices.

Embodiments are now described in detail with reference to the figures. FIG. 1 is a block diagram depicting a network environment 100 for collecting and sharing telemetry data from network devices, in accordance with an example embodiment. As depicted, network environment 100 includes a plurality of devices 105A-105N, a network 135, a telemetry server 140, a client device 170, and a plurality of applications 185A-185N. It is to be understood that the functional division among components of network environment 100 have been chosen for purposes of explaining the embodiments and is not to be construed as a limiting example.

Each device 105A-105N includes a network interface (I/F) 110, a processor 115, and memory 125. The network I/F 110 may include one or more network processor Application Specific Integrated Circuits (ASICs) that perform network functions, and a plurality of ports. The memory 125 stores software instructions for telemetry module 130, as well as various other data involved in operations performed by the processor 115. In various embodiments, devices 105A-105N may include any programmable electronic device capable of executing computer readable program instructions. Devices 105A-105N may thus include any network devices, such as devices that perform routing, switching, gateway, network access, firewall, or other network functions. Each device 105A-105N may include internal and external hardware components, as depicted and described in further detail with respect to FIG. 6.

Telemetry module 130 may collect and store telemetry data relating to a device's health and performance, which can be transmitted to one or more network-accessible recipients, such as telemetry server 140 or applications 185A-185N. Telemetry data may include data relating to an operational state of a network device, data collected by a network device, and the like. For example, telemetry data may indicate a signal strength of a wireless connection of an antenna associated with a network device, memory capacity, central processing unit (CPU) utilization, power consumption, etc. Telemetry data may be used to generate key performance indicators (KPIs) for a network device, which can indicate a device's health.

Telemetry module 130 may collect data corresponding to any data type, format, or protocol, including telemetry data that follows a YANG model, telemetry data that correspond to a Simple Network Management Protocol (SNMP) protocol, a Common Layer Interface (CLI) format, and/or any other format. In some embodiments, telemetry module 130 converts telemetry data that does not conform to a YANG model into a YANG data model format. Telemetry module 130 may store data in a hierarchical tree representation of parent and child nodes, also referred to as paths and leafs, with each child node storing a particular portion or bit of the collected telemetry data.

Network 135 may include a local area network (LAN), a wide area network (WAN) such as the Internet, or a combination thereof, and includes wired, wireless, or fiber optic connections. In general, network 135 can use any combination of connections and protocols that support communications between devices 105A-105N, telemetry server 140, client device 170, and/or applications 185A-185N via their respective network interfaces.

Telemetry server 140 includes a network interface (I/F) 141, a processor 142, memory 145, and a database 165. The memory 145 stores software instructions for a collection module 150 and an application manager 155, as well as various other data involved in operations performed by the processor 142. In various embodiments, telemetry server 140 may include any programmable electronic device capable of executing computer readable program instructions. Telemetry server 140 may include internal and external hardware components, as depicted and described in further detail with respect to FIG. 6.

Collection module 150 and application manager 155 may include one or more modules or units to perform various functions of the embodiments described below. Collection module 150 and application manager 155 may be implemented by any combination of any quantity of software (and/or hardware modules or units), and may reside within memory 145 of telemetry server 140 for execution by a processor, such as processor 142.

Collection module 150 may obtain telemetry data from devices, such as devices 105A-105N, to respond to requests for telemetry data from applications, such as applications 185A-185N. Additionally or alternatively, collection module 150 may optimize requests for data and enable requesting applications to obtain telemetry data from devices 105A-105N according to the optimized requests. In some embodiments, collection module 150 manages a centralized collection service for telemetry data by managing a prefix-based tree structure of MIB and YANG tables, as well as a min-heap of different cadences of paths across applications per device. A cadence refers to the frequency at which an application requires telemetry data. Using the tree structure, collection module 150 performs path prefix retrieval, and dynamically evaluates cadences of applications registered with application manager 155 to optimize collection. In particular, when multiple applications are requesting data that share a common parent node in the tree structure of a device, collection module 150 may optimize the requests by identifying the common node so that data may be retrieved from the node in one operation, rather than performing individual retrieval operations to retrieve telemetry data from several child nodes. Moreover, collection module 150 may utilize the min-heap to determine a minimum viable cadence across all applications requesting data from a device, and may thus collect from paths at a cadence that satisfies the service level agreements of all applications. For example, if a particular application requests data every minute, and another application requests data every three minutes, collection module 150 will analyze the cadences and provide the requested data every minute, thus satisfying both applications. Thus, a path is polled a minimum number of times, regardless of the number of applications and different cadences, thereby reducing the data collection load on devices in a network.

Application manager 155 may manage applications that request telemetry data from network devices, such as devices 105A-105N. An application may register with application manager 155 and may indicate the telemetry data that the application is requesting along with a cadence for the request. Application manager 155 may provide collection module 150 with information including the data requested by applications, the cadence at which the data is sought, as well as the identities of the requesting applications. Application manager 155 may provide collection module 150 with updated information whenever new requests are received and/or requests are modified. For example, an additional application may register and begin requesting data, an application may change the cadence at which data is requested, and/or an application may request different portions of data from a device. Thus, application manager 155 may authorize applications to request and receive telemetry data from telemetry server 140.

Database 165 may include any non-volatile storage media known in the art. For example, database 165 can be implemented with a tape library, optical library, one or more independent hard disk drives, or multiple hard disk drives in a redundant array of independent disks (RAID). Similarly, data in database 165 may conform to any suitable storage architecture known in the art, such as a file, a relational database, an object-oriented database, and/or one or more tables. Database 165 may store data such as identifiers and network paths of devices 105A-105N and applications registered with telemetry server 140, historical telemetry data (e.g., time series data), and the like.

Client device 170 includes a network interface 171, at least one processor 172, and memory 175 with an administration module 180. In various embodiments, client device 170 may include any programmable electronic device capable of executing computer readable program instructions. Network interface 171 may include one or more network interface cards that enable components of client device 170 to send and receive data over a network, such as network 135. Client device 170 may include internal and external hardware components, as depicted and described in further detail with respect to FIG. 6.

Administration module 180 may enable a user of client device 170, such as network operator, to provide input to collection module 150 and/or application manager 155 to manage network monitoring, updating, and remediation tasks. A user of client device 170 may manage configurations and devices using a user interface.

Applications 185A-185N may include any software that collects, processes, monitors, or otherwise utilizes telemetry data of devices 105A-105N. Applications 185A-185N may obtain, via network 135, telemetry data from devices 105A-105N directly and/or through telemetry server 140, which may fetch telemetry data from devices 105A-105N and transmit to applications 185A-185N. Applications 185A-185N can be associated with one or more tenants, organizations, or other entities.

Figure 2:
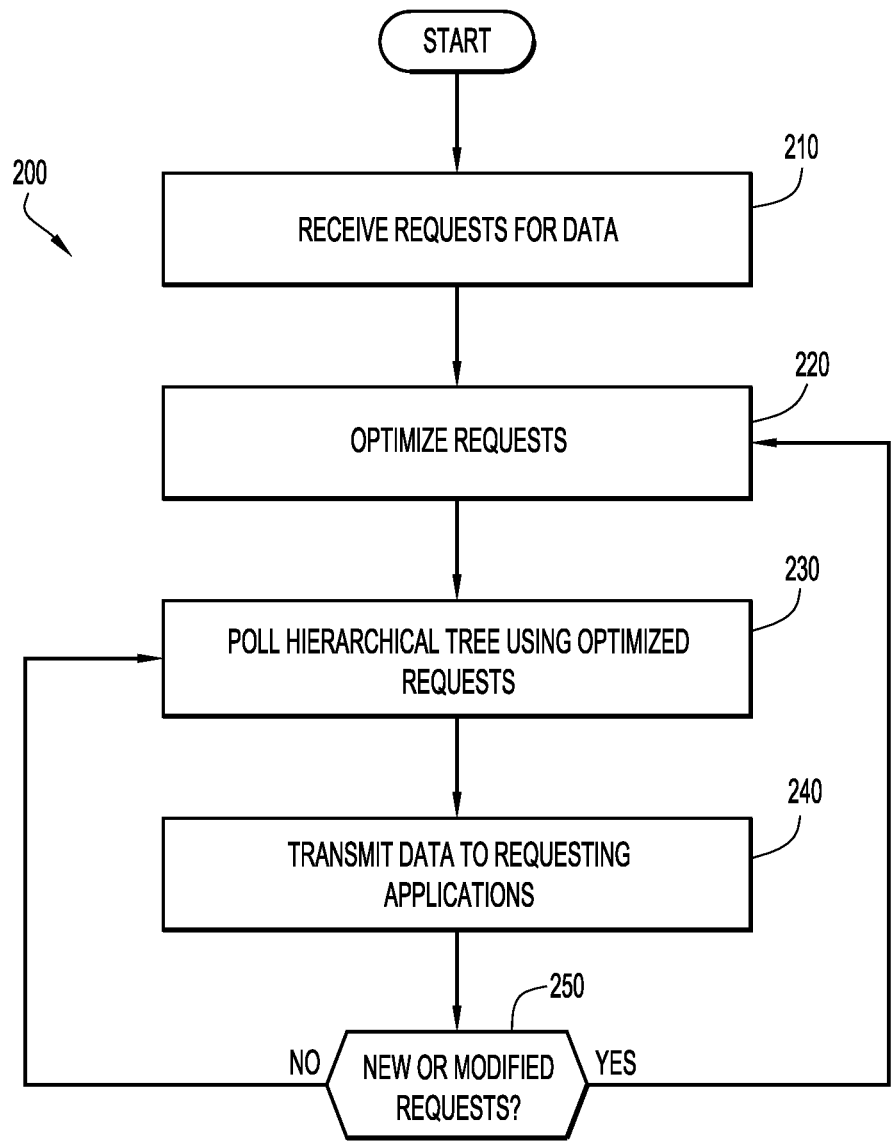
FIG. 2 is a flow chart depicting a method of collecting and sharing telemetry data for network devices, in accordance with an example embodiment.

Reference is now made to FIG. 2. FIG. 2 is a flow chart depicting a method 200 of collecting and sharing telemetry data, in accordance with an example embodiment.

Requests for telemetry data are received at operation 210. One or more applications, such as applications 185A-185N, may transmit requests for telemetry data to telemetry server 140. Each request includes a path of the requested telemetry data that indicates where the data is stored in a hierarchical tree representation comprising a plurality of nodes. A path may specify a particular leaf of a particular node where a network device may store a portion of telemetry data. Each request also includes a cadence, which is a time duration that indicates how frequently to poll the specified path in the hierarchical tree. For example, one application may request a specific portion of telemetry data from a network device every ten seconds, another application may request the same portion of telemetry data and/or other portions of telemetry data every thirty seconds, etc.

Requests for data are optimized at operation 220. Collection module 150 may optimize requests by comparing the paths of requests to identify any requested data that is stored adjacent to other requested data in the hierarchical tree. For example, if two requested portions of data are both leaves of a same parent node, the requests may be merged into a singular request that polls the parent node for all of the data stored in its leaves. Thus, a network device need only respond to a single request rather than multiple requests, which may reduce the amount of computational resources required to satisfy the requests. When multiple requests are merged into a single request, the resulting request receives a cadence that will satisfy the cadences of all of its constituent requests. For example, if a request from a first application has a cadence of ten seconds, and a request from a second application has a cadence of twenty seconds, an optimized request resulting from merging the two requests may be assigned a cadence of ten seconds, which satisfies the requirements of both applications. In some embodiments, collection module 150 generates an optimized set of requests by analyzing received requests using a min-heap.

The hierarchical tree associated with a network device is polled using the optimized set of requests at operation 330. Requests for data are received at operation 230. Optimized requests may be transmitted to a network device via telemetry server 140, and the network device may satisfy each optimized request by transmitting the requested data to telemetry server 140 and/or the requesting application(s) (e.g., applications 185A-185N) at operation 240. The hierarchical tree associated with a network device is polled for the requested data at the specified paths and at the times that are indicated by the cadences of the optimized requests.

Each device 105A-105N may store telemetry data in the hierarchical tree as the data is generated or obtained by the network device. The telemetry data may follow a YANG model or, if not, may be converted into a YANG format.

Operation 250 determines whether a new or modified request is received from an application. For example, an application may modify the paths and/or cadences of data requests, other applications may begin requesting data from a network device, and/or an application may stop requesting data from a network device. If it is determined at operation 250 that the requests of applications have not changed, then the hierarchical tree remains polled according to the optimized set of requests at operation 230. Alternatively, if there are new or modified requests, then a new optimized set of requests is generated at operation 220, and the hierarchical tree is then polled accordingly at operation 230.

Figure 3A:
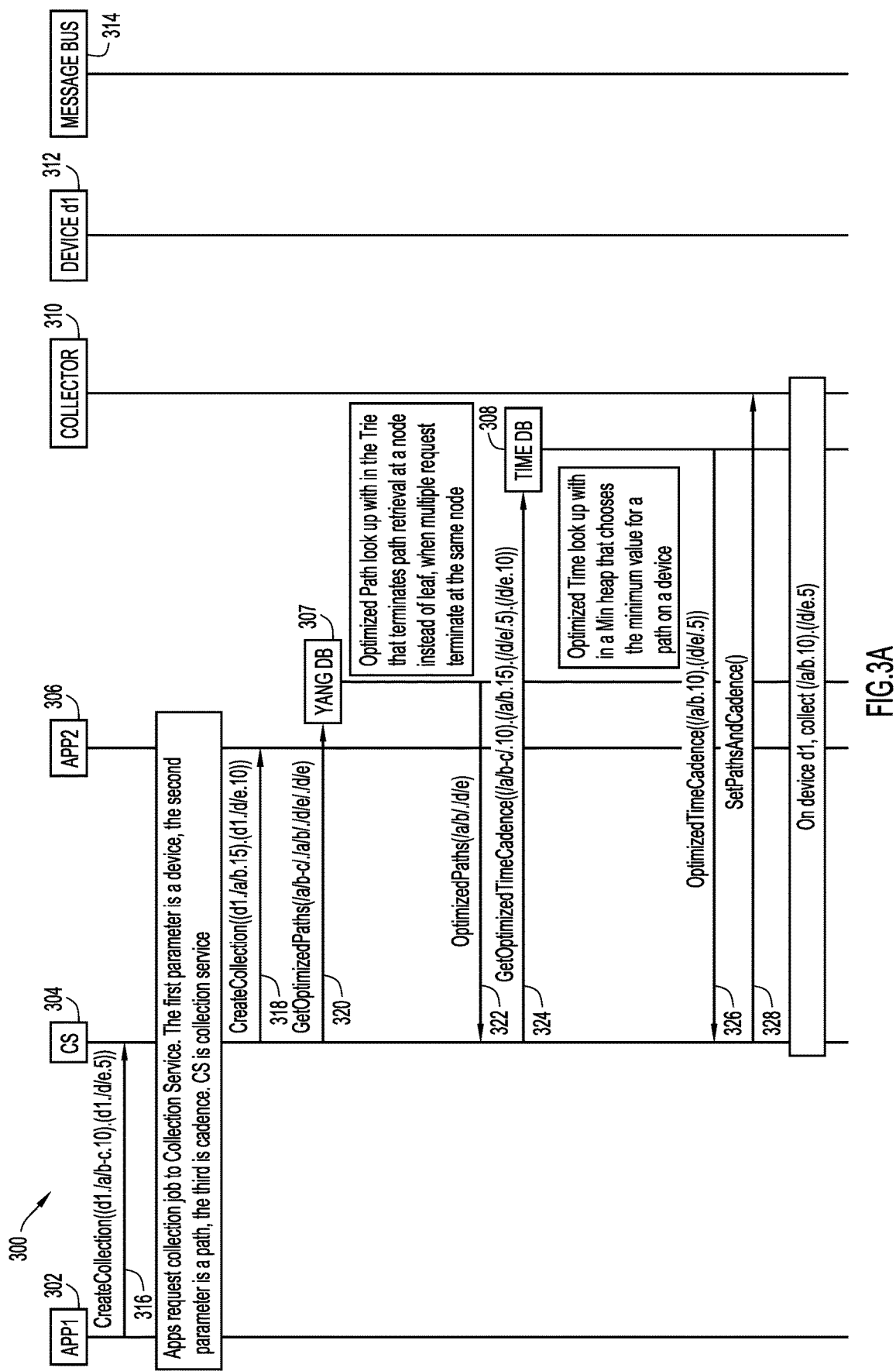
FIGS. 3A and 3B are diagrams depicting an operational flow for collecting and sharing telemetry data for network devices, in accordance with an example embodiment.
Figure 3B:
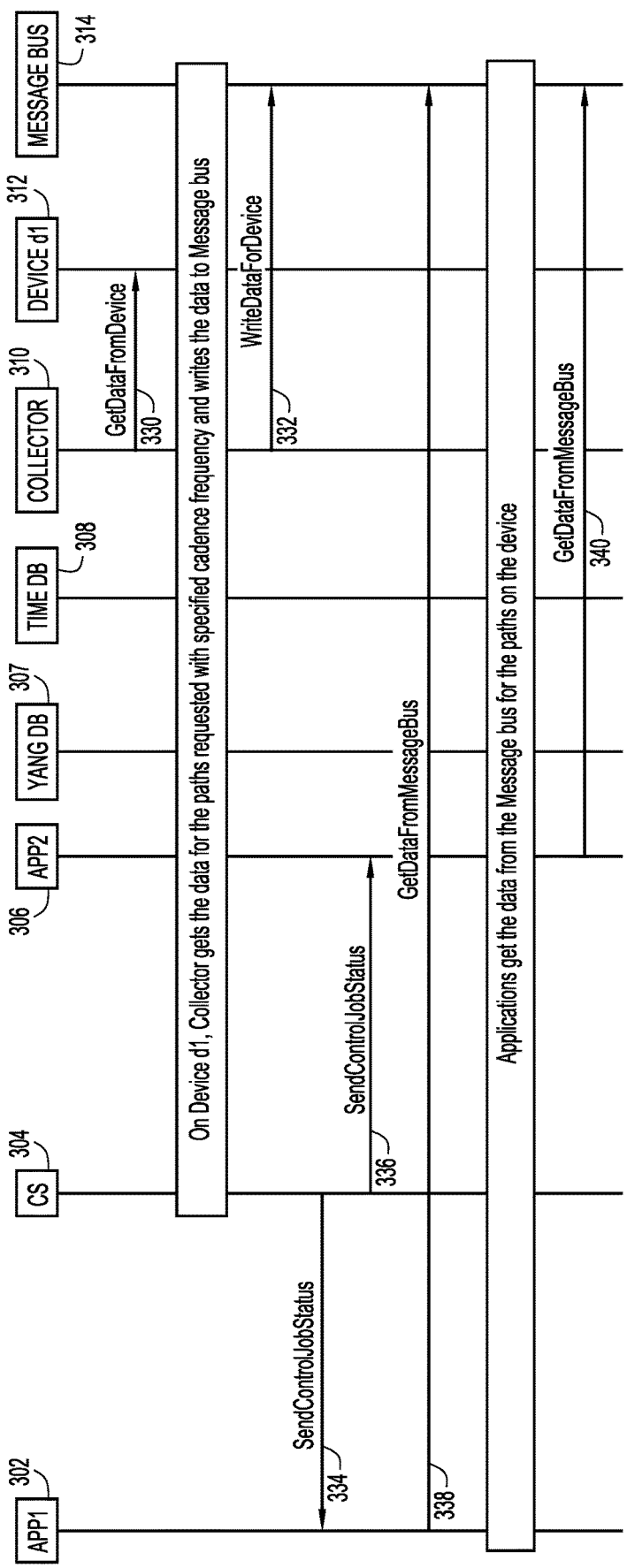

Reference is now made to FIGS. 3A and 3B. FIGS. 3A and 3B are diagrams depicting an operational flow 300 for collecting and sharing telemetry data for network devices, in accordance with an example embodiment. As depicted, flow 300 shows the flow of data between applications 302 and 306, a collection service 304, a collector 310, a YANG database 307, a time database 308, and a message bus 314. Applications 302 and 306 may be implemented by any of applications 185A-185N. Collection service 304, collector 310, YANG database 307, and/or time database 308 may be implemented by collection module 150 of telemetry server 140. Device 312 may be any of devices 105A-105N.

At operation 316, a first application 302 may transmit requests for collection of data that is received by collection service 304. In the depicted example, a first request specifies a device (e.g., "d1," represented by device 312), a path (e.g., "/a/b-c") and a cadence (e.g., "10"), and a second request specifies a same device (e.g., "d1," represented by device 312), a path (e.g., "/d/e"), and a cadence (e.g., "5"). Similarly, at operation 318, a second application 306 transmits requests for data from device d1: a first request having a path /a/b and cadence of 15, and a second request having a path of /d/e and cadence of 10.

At operation 320, collection service 304 transmits a message requesting path optimization to YANG database 307, and at operation 324, collection service 304 transmits a message requesting cadence optimization to time database 308. YANG database 307 responds with optimized paths (e.g., "/a/b" and "/d/e") at operation 322, and time database 308 responds with optimized cadences (e.g., "10" for path "/a/b," and "5" for path "/d/e") at operation 326.

Collection service 304 transmits a message to collector 310 at operation 328 to set the paths and cadences based on the optimized paths and cadences. In the depicted example, the optimized set of requests includes a request for telemetry data stored in path "/a/b" at a cadence of 10, and another request for telemetry data stored in path "/d/e" at a cadence of 5. At operation 330, collector 310 obtains the requested data from device 312 and at operation 332, collector 310 writes the data to message bus 314. Applications may be notified that there is data available in the message bus 314 by collection service 304, which transmits messages indicating the job status at operations 334 and 336. Data written to message bus 314 may then be obtained by requesting applications; in the depicted example, application 302 requests data from message bus 314 at operation 338, and application 306 requests data at operation 340.

Reference is now made to FIG. 4A. FIG. 4A is a diagram depicting operational flow 400 for optimizing data retrieval, in accordance with an example embodiment. Operational flow 400 depicts the optimization of a request 402 for telemetry data from leaves L1 and L3 of path P1 and leaf L1 of path P2, which are depicted accordingly in hierarchical tree 404. This is consolidated into a request for all data from path P1, and a request for leaf L1 of path P2, depicted by optimized request 406.

Figure 4B:
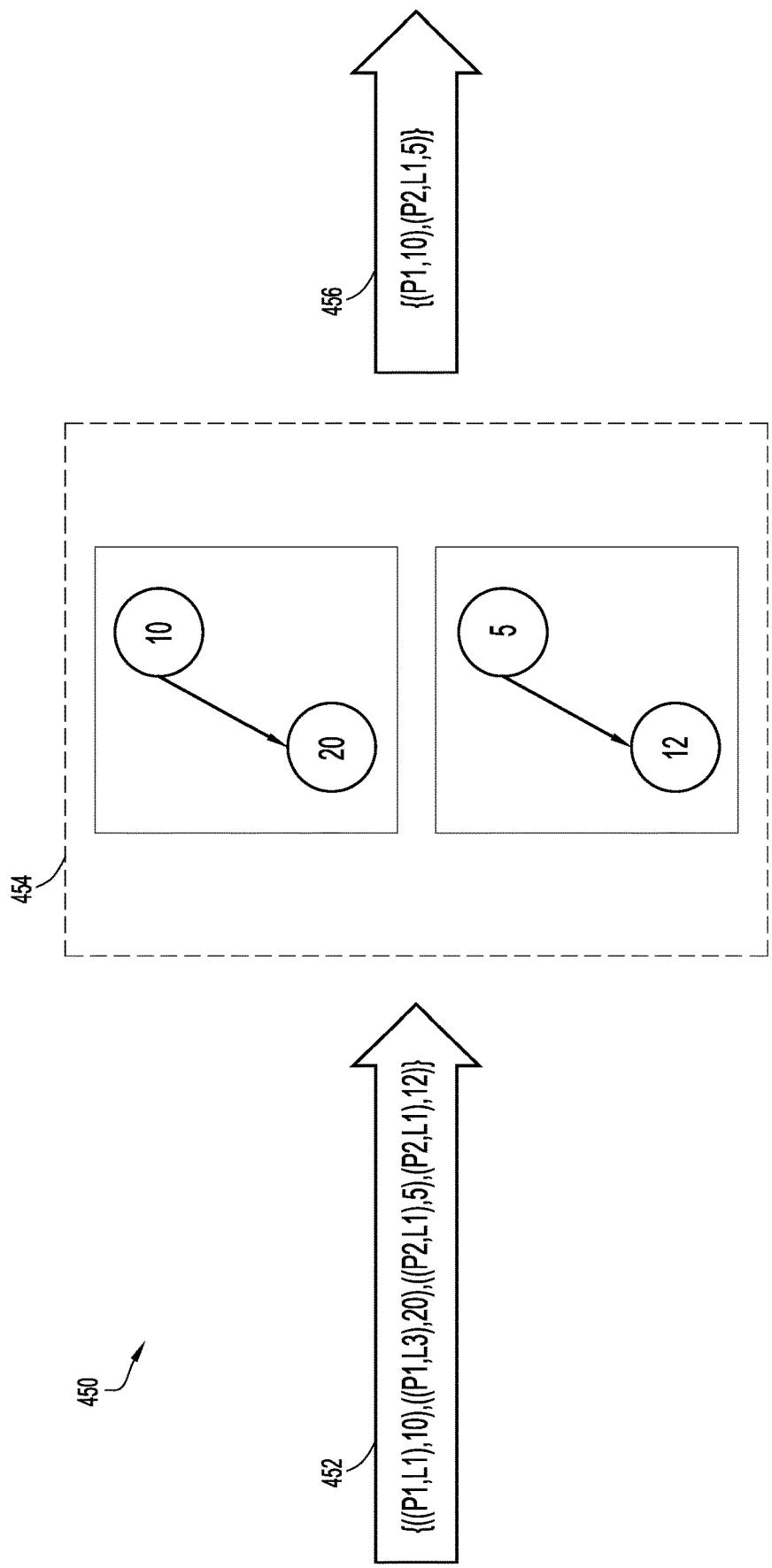

Reference is now made to FIG. 4B. FIG. 4B is a diagram depicting operational flow 450 for optimizing data retrieval, in accordance with an example embodiment. As depicted, a min-heap table 454 is utilized to find a cadence that satisfies all received requests 452. One request is for data stored in leaf L1 of path P1 every 10 units of time (e.g., seconds, milliseconds, etc), another request is for data stored in leaf L3 of path P1 every 20 units of time, another request is for data stored in leaf L1 of path P2 every 5 units of time, and another request is for data stored in leaf L1 of path P2 every 12 units of time. These requests can be optimized based on their cadences to a request for path P1 every 10 units of time, and for leaf L1 of path P2 every 5 units of time, depicted by the optimized request 456.

Reference is now made to FIG. 5. FIG. 5 is a block diagram 500 depicting collection and sharing of telemetry data from a network device, in accordance with an example embodiment. As depicted, input 505 includes requests for data made by three different applications: a first job, Job A, requires data relating to sensor X of device 10 to be sent to a first destination (e.g., "Destination1") at a cadence of 5, a second job, Job B, similarly requires data to be sent to Destination2 at a cadence of 25, and a third job, Job C, requires data to be to Destination3 at a cadence of 43. These requests are collected and optimized at 510 to output optimized request 515, which requests data from sensor X of device 10 at a cadence of 5. This cadence satisfies the requirements of all three jobs, and is selected such that no more polls of device 10 are performed than is necessary (for example, while a cadence value of three would likewise satisfy all three jobs, no job actually requires data that frequently).

The optimized request 515 is distributed at 520, and the requested data is sent to the requesting applications via a message bus. According to output 525, the requested data is distributed at intervals that are multiples of the collect cadence: data is transmitted to Destination1 at a cadence of 5, to Destination2 at a cadence of 25, and Destination3 at a cadence of 40, since that is the closest value to the cadence of 43 that still satisfies the requirements of Job C. When an output cadence (e.g., 43) cannot be performed as a multiple of the optimized collect cadence (e.g., 5), the output cadence may be rounded down to the nearest multiple of the optimized cadence (e.g., 43 is rounded down to 40, which is a multiple of 5). In other embodiments, an output cadence may be rounded up to the nearest multiple of the optimized collect cadence (e.g., 43 may be rounded up to 45). Alternatively, an output cadence that cannot be performed as a multiple of the optimized collect cadence may be rounded up or rounded down, depending on whichever value is nearer. For example, an output cadence of 43 would be rounded up to 45, whereas an output cadence of 42 would be rounded down to 40.

Figure 6:
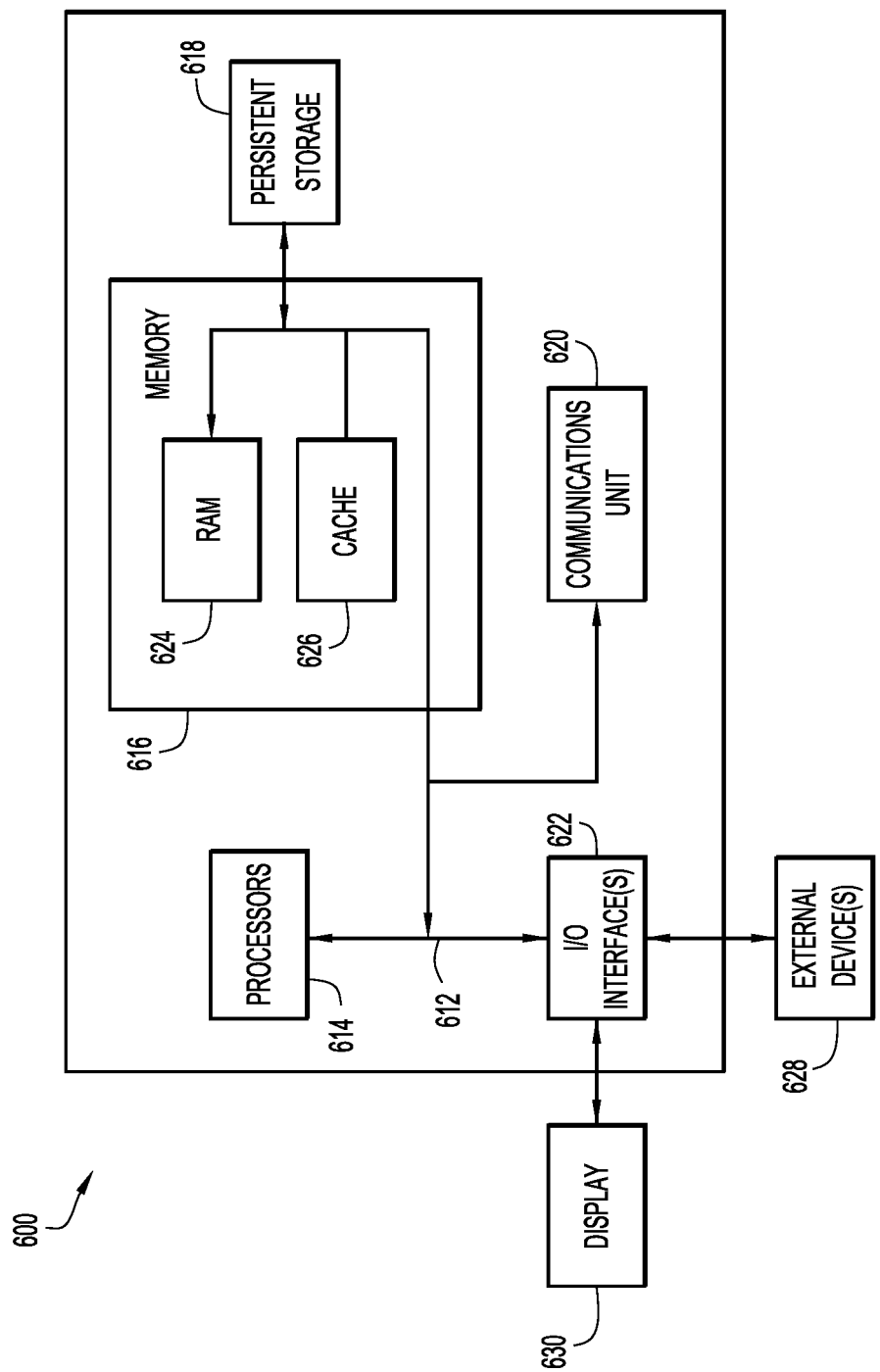
FIG. 6 is a block diagram depicting a computing device configured to perform the methods presented herein, in accordance with an example embodiment.

Reference is now made to FIG. 6. FIG. 6 is a block diagram depicting components of a computer 600 suitable for executing the methods disclosed herein. Computer 600 may implement devices 105A-105N, telemetry server 140, and/or client device 170 in accordance with embodiments presented herein. It should be appreciated that FIG. 6 provides only an illustration of one embodiment and does not imply any limitations with regard to the environments in which different embodiments may be implemented. Many modifications to the depicted environment may be made.

As depicted, the computer 600 includes communications fabric 612, which provides communications between computer processor(s) 614, memory 616, persistent storage 618, communications unit 620, and input/output (I/O) interface(s) 622. Communications fabric 612 can be implemented with any architecture designed for passing data and/or control information between processors (such as microprocessors, communications and network processors, etc.), system memory, peripheral devices, and any other hardware components within a system. For example, communications fabric 612 can be implemented with one or more buses.

Memory 616 and persistent storage 618 are computer readable storage media. In the depicted embodiment, memory 616 includes random access memory (RAM) 624 and cache memory 626. In general, memory 16 can include any suitable volatile or non-volatile computer readable storage media. The memory 616 may store the software instructions for telemetry module 130, collection module 150, application manager 155, and/or administration module 180 in performing the operations described herein.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer 600. For example, I/O interface 622 may provide a connection to external devices 628 such as a keyboard, keypad, a touch screen, and/or some other suitable input device. External devices 628 can also include portable computer readable storage media such as, for example, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to collecting and sharing telemetry data from network devices (e.g., device information, telemetry data, application data, cadence data, etc.) may be stored within any conventional or other data structures (e.g., files, arrays, lists, stacks, queues, records, etc.) and may be stored in any desired storage unit (e.g., database, data or other repositories, queue, etc.). The data transmitted between devices 105A-105N, telemetry server 140, and/or client device 170 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to collecting and sharing telemetry data from network devices (e.g., device information, telemetry data, application data, cadence data, etc.) may include any information provided to, or generated by, devices 105A-105N, telemetry server 140, and/or client device 170. Data relating to collecting and sharing telemetry data from network devices may include any desired format and arrangement, and may include any quantity of any types of fields of any size to store any desired data. The data relating to collecting and sharing telemetry data from network devices may include any data collected about entities by any collection means, any combination of collected information, and any information derived from analyzing collected information.

The present embodiments may employ any number of any type of user interface (e.g., representational state transfer (REST) application programming interfaces (API), Graphical User Interface (GUI), command-line, prompt, etc.) for obtaining or providing information (e.g., data related to collecting and sharing telemetry data from network devices) where the interface may include any information arranged in any fashion. The interface may include any number of any types of input or actuation mechanisms (e.g., REST APIs, buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing path and cadence optimization for efficient data collection from devices.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., networking software, server software, telemetry module 130, collection module 150, application manager 155, administration module 180, etc.). These systems may include any types of monitors and input devices (e.g., keyboard, mouse, voice recognition, etc.) to enter and/or view information.

It is to be understood that the software (e.g., networking software, server software, telemetry module 130, collection module 150, application manager 155, administration module 180, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., networking software, server software, telemetry module 130, collection module 150, application manager 155, administration module 180, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to collecting and sharing telemetry data from network devices). The database system may be implemented by any number of any conventional or other databases, data stores or storage structures (e.g., files, databases, data structures, data or other repositories, etc.) to store information (e.g., data relating to collecting and sharing telemetry data from network devices). The database system may be included within or coupled to the server and/or client systems. The database systems and/or storage structures may be remote from or local to the computer or other processing systems, and may store any desired data (e.g., data relating to collecting and sharing telemetry data from network devices).

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the present embodiments in the form disclosed. Many modifications and variations will be apparent to those of ordinary skill in the art without departing from the scope and spirit of the presented embodiments. The embodiment was chosen and described in order to best explain the principles of the presented embodiments and the practical application, and to enable others of ordinary skill in the art to understand various embodiments with various modifications as are suited to the particular use contemplated.

The descriptions of the various embodiments of the present embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of the presented embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a computer-implemented method is provided comprising: receiving a plurality of requests, from one or more applications, for telemetry data that is stored in a hierarchical tree comprising a plurality of nodes, wherein the telemetry data indicates an operational status and performance of a device, wherein each request includes a cadence indicating a timespan at which the request repeats, and wherein each request specifies a path in the hierarchical tree where a requested portion of the telemetry data is stored, processing the plurality of requests to produce an optimized set of requests by merging any two or more requests whose paths indicate portions of data that share a common parent node in the hierarchical tree, wherein a merged request is assigned a cadence corresponding to a shortest cadence among the two or more requests, and polling the hierarchical tree according to the optimized set of requests to satisfy the plurality of requests.

In another form, the computer-implemented method further includes: receiving an updated plurality of requests differing in one or more of: the portions of the telemetry data being requested, and the cadence of one or more requests, and updating the optimized set of requests based on the updated plurality of requests.

In another form the telemetry data is formatted according to a Yet Another Next Generation (YANG) data model, and wherein the telemetry data is stored in the hierarchical tree according to prefixes of the telemetry data. In another form, the telemetry data is converted to a Yet Another Next Generation (YANG) data model prior to storing the telemetry data in the hierarchical tree.

In one form, polling the hierarchical tree according to a merged request comprises collecting data from all child nodes of the common parent node.

In another form, the plurality of requests are received from one or more applications.

In one form, the hierarchical tree comprises management information base (MIB) descriptions of network objects.

In another form, an apparatus is provided comprising: a communication interface configured to enable network communications; one or more computer processors; one or more computer readable storage media; program instructions stored on the one or more computer readable storage media for execution by at least one of the one or more computer processors, that when executed by the one or more computer processors, cause the one or more computer processors to: receive a plurality of requests, from one or more applications, for telemetry data that is stored in a hierarchical tree comprising a plurality of nodes, wherein the telemetry data indicates an operational status and performance of a device, wherein each request includes a cadence indicating a timespan at which the request repeats, and wherein each request specifies a path in the hierarchical tree where a requested portion of the telemetry data is stored; process the plurality of requests to produce an optimized set of requests by merging any two or more requests whose paths indicate portions of data that share a common parent node in the hierarchical tree, wherein a merged request is assigned a cadence corresponding to a shortest cadence among the two or more requests; and poll the hierarchical tree according to the optimized set of requests to satisfy the plurality of requests.

In another form, one or more non-transitory computer readable storage media are provided that are encoded with instructions that, when executed by one or more processors, cause the one or more processors to: receive a plurality of requests, from one or more applications, for telemetry data that is stored in a hierarchical tree comprising a plurality of nodes, wherein the telemetry data indicates an operational status and performance of a device, wherein each request includes a cadence indicating a timespan at which the request repeats, and wherein each request specifies a path in the hierarchical tree where a requested portion of the telemetry data is stored; process the plurality of requests to produce an optimized set of requests by merging any two or more requests whose paths indicate portions of data that share a common parent node in the hierarchical tree, wherein a merged request is assigned a cadence corresponding to a shortest cadence among the two or more requests; and poll the hierarchical tree according to the optimized set of requests to satisfy the plurality of requests.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for collecting and sharing telemetry data, the method comprising:

receiving a plurality of requests, from one or more applications, for telemetry data that is stored in a hierarchical tree representation comprising a plurality of nodes, wherein the telemetry data indicates an operational status and performance of a device, wherein each request includes a cadence indicating a timespan at which the request repeats, and wherein each request specifies a path in the hierarchical tree representation where a requested portion of the telemetry data is stored;

processing the plurality of requests to produce an optimized set of requests by merging any two or more requests whose paths indicate portions of data that share a common parent node in the hierarchical tree representation, wherein a merged request is assigned a cadence corresponding to a shortest cadence among the two or more requests; and polling the hierarchical tree representation according to the optimized set of requests to satisfy the plurality of requests.

2. The method of claim 1, wherein the telemetry data is formatted according to a Yet Another Next Generation (YANG) data model, and wherein the telemetry data is stored in the hierarchical tree representation according to prefixes of the telemetry data.

3. The method of claim 1, further comprising:

receiving an updated plurality of requests differing in one or more of: the portions of the telemetry data being requested, and the cadence of one or more requests; and updating the optimized set of requests based on the updated plurality of requests.

4. The method of claim 1, wherein polling the hierarchical tree representation according to a merged request comprises collecting data from all child nodes of the common parent node.

5. The method of claim 1, wherein the plurality of requests are received from one or more applications.

6. The method of claim 1, wherein the telemetry data is converted to a Yet Another Next Generation (YANG) data model prior to storing the telemetry data in the hierarchical tree representation.

7. The method of claim 1, wherein the hierarchical tree representation comprises management information base (MIB) descriptions of network objects.

8. An apparatus comprising:

a communication interface configured to enable network communications;

one or more computer processors;

one or more computer readable storage media;

program instructions stored on the one or more computer readable storage media for execution by at least one of the one or more computer processors, that when executed by the one or more computer processors, cause the one or more computer processors to:

receive a plurality of requests, from one or more applications, for telemetry data that is stored in a hierarchical tree representation comprising a plurality of nodes, wherein the telemetry data indicates an operational status and performance of a device, wherein each request includes a cadence indicating a timespan at which the request repeats, and wherein each request specifies a path in the hierarchical tree representation where a requested portion of the telemetry data is stored;

process the plurality of requests to produce an optimized set of requests by merging any two or more requests whose paths indicate portions of data that share a common parent node in the hierarchical tree representation, wherein a merged request is assigned a cadence corresponding to a shortest cadence among the two or more requests; and poll the hierarchical tree representation according to the optimized set of requests to satisfy the plurality of requests.

9. The apparatus of claim 8, wherein the telemetry data is formatted according to a Yet Another Next Generation (YANG) data model, and wherein the telemetry data is stored in the hierarchical tree representation according to prefixes of the telemetry data.

10. The apparatus of claim 8, wherein the program instructions further cause the one or more computer processors to:

receive an updated plurality of requests differing in one or more of: the portions of the telemetry data being requested, and the cadence of one or more requests; and update the optimized set of requests based on the updated plurality of requests.

11. The apparatus of claim 8, wherein the program instructions to poll the hierarchical tree representation according to a merged request cause the one or more computer processors to collect data from all child nodes of the common parent node.

12. The apparatus of claim 8, wherein the plurality of requests are received from one or more applications.

13. The apparatus of claim 8, wherein the telemetry data is converted to a Yet Another Next Generation (YANG) data model prior to storing the telemetry data in the hierarchical tree representation.

14. The apparatus of claim 8, wherein the hierarchical tree representation comprises management information base (MIB) descriptions of network objects.

15. One or more non-transitory computer readable storage media encoded with instructions that, when executed by one or more computer processors, cause the one or more computer processors to:

receive a plurality of requests, from one or more applications, for telemetry data that is stored in a hierarchical tree representation comprising a plurality of nodes, wherein the telemetry data indicates an operational status and performance of a device, wherein each request includes a cadence indicating a timespan at which the request repeats, and wherein each request specifies a path in the hierarchical tree representation where a requested portion of the telemetry data is stored;

process the plurality of requests to produce an optimized set of requests by merging any two or more requests whose paths indicate portions of data that share a common parent node in the hierarchical tree representation, wherein a merged request is assigned a cadence corresponding to a shortest cadence among the two or more requests; and poll the hierarchical tree representation according to the optimized set of requests to satisfy the plurality of requests.

16. The one or more non-transitory computer readable storage media of claim 15, wherein the telemetry data is formatted according to a Yet Another Next Generation (YANG) data model, and wherein the telemetry data is stored in the hierarchical tree representation according to prefixes of the telemetry data.

17. The one or more non-transitory computer readable storage media of claim 15, wherein the instructions further cause the one or more computer processors to:

receive an updated plurality of requests differing in one or more of: the portions of the telemetry data being requested, and the cadence of one or more requests; and update the optimized set of requests based on the updated plurality of requests.

18. The one or more non-transitory computer readable storage media of claim 15, wherein the instructions to poll the hierarchical tree representation according to a merged request cause the one or more computer processors to collect data from all child nodes of the common parent node.

19. The one or more non-transitory computer readable storage media of claim 15, wherein the plurality of requests are received from one or more applications.

20. The one or more non-transitory computer readable storage media of claim 15, wherein the telemetry data is converted to a Yet Another Next Generation (YANG) data model prior to storing the telemetry data in the hierarchical tree representation.

* * * * *